United States Patent Office 3,443,553
Patented May 13, 1969

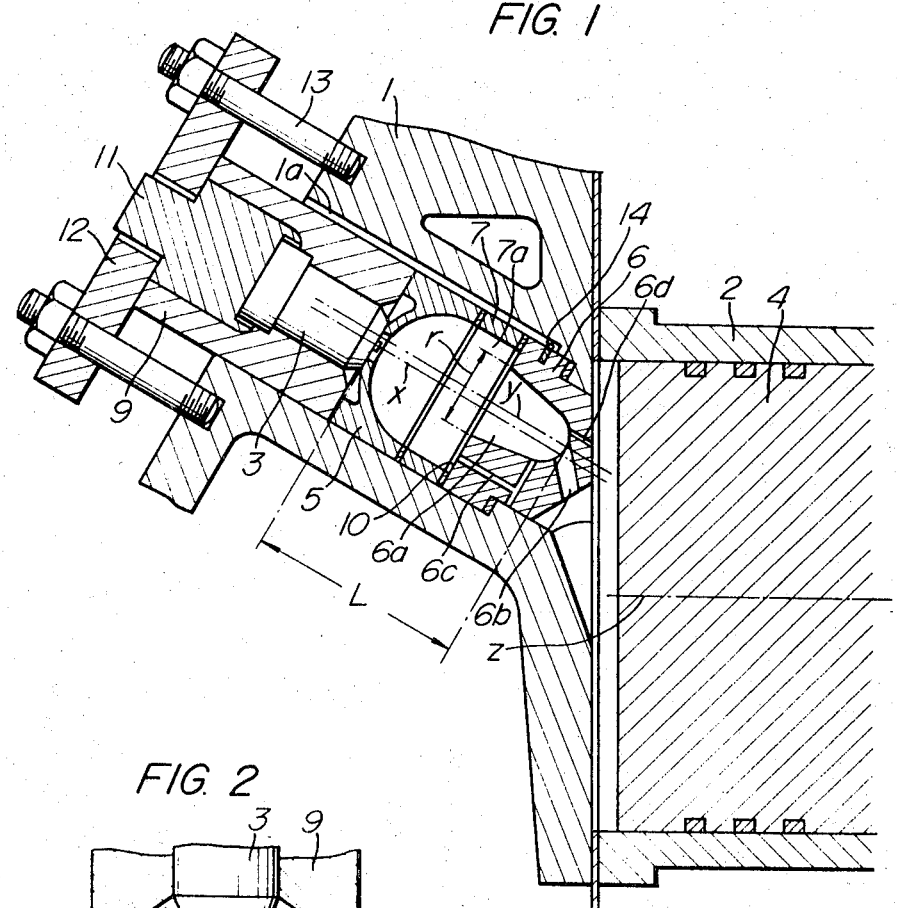
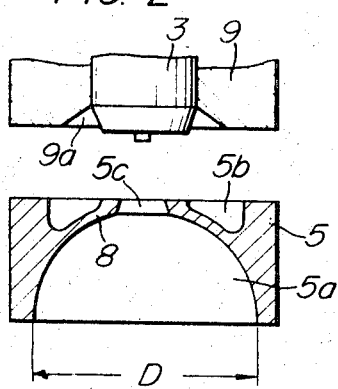

3,443,553
PRECOMBUSTION CHAMBER OF DIESEL ENGINE
Tadashi Yamada, Suita-shi, and Shinichi Tsujimoto, Takatsuki-shi, Japan, assignors to Tadao Yamaoka, Yamatecho, Ashiya-shi, Japan
Filed Dec. 4, 1967, Ser. No. 687,568
Int. Cl. F02b *19/08*
U.S. Cl. 123—32        2 Claims

ABSTRACT OF THE DISCLOSURE

A precombustion chamber for a diesel engine, consisting of a front chamber section and a rear chamber section in communication with each other with the center line of the former being offset from the center line of the latter in parallel relation thereto and with an annular flat shoulder defined therebetween, said front chamber section being in communication with the main combustion chamber in the cylinder of the engine through a main passage, said rear chamber section having that end remote from said main passage shaped in a semispherical configuration with a fuel injection nozzle open therein, the center line of said rear chamber section being substantially in alignment with the center line of said fuel injection nozzle and inclined at a suitable angle with respect to the center line of the cylinder, the opening of said main passage in said front chamber section being located in the proximity of the center line of said fuel injection nozzle, and in the wall of said front chamber section there being formed a communication channel having one end open in said rear chamber section at a point on said annular flat shoulder and the other end open in said front chamber section or said main combustion chamber in the cylinder.

BACKGROUND OF THE INVENTION

Field of the invention

The present invention relates to a precombustion chamber of a diesel engine, which has a unique configuration adapted to improve the performances of the engine.

Description of the prior art

It is well known that the performances of an engine are largely influenced by the correlation among the configuration, dimensions, volume ratio, fuel passage and spray distance of the combustion chamber, and can be improved by only a slight change in configuration of the combustion chamber. However, it is not too much to say that the most suitable configuration of the combustion chamber can be determined by no way other than resorting to experiment which involves many difficulties.

A conventional internal combustion engine of the type having a precombustion chamber has possessed many disadvantages over that of direct injection type, that it is complicated in construction, poor in thermal efficiency and difficult to start, and further that the combustion is slow. These disadvantages have been great obstacles against the realization of high speed diesel engines.

SUMMARY OF THE INVENTION

It is, therefore, the object of the present invention to provide a swirl-type precombustion chamber which is capable of eliminating the aforesaid drawbacks by the ingenious combination of the meritorious features of both of swirl chamber and precombustion chamber, attained based on a theory established by the present inventors and the result of experiments conducted to substantiate said theory, and which enables the specific fuel consumption to be lowered drastically, the exhaust smoke level to be bettered and the starting characteristic to be improved outstandingly, as compared with the conventional precombustion chambers, and thereby makes the production of high speed diesel engines possible.

According to the present invention, there is provided a precombustion chamber of diesel engine, which is formed with a rear chamber section defined by a columnar member and having the upper portion shaped into semispherical or substantially semispherical configuration, and a front chamber section in communication with said rear chamber section, the center line of said rear chamber section being inclined at a suitable angle with respect to the center line of the cylinder of the engine, said rear and front chamber sections forming a flat annular shoulder at the boundary therebetween, in the wall of a member defining said front chamber there being formed a communication channel having one end open in said rear chamber section at a point on said shoulder and the other end open in said front chamber section or the main chamber in the cylinder of the engine, the center line of said rear chamber section being substantially in alignment with the center line of the fuel injection nozzle, the center line of said front chamber section being offset from the center line of said rear chamber section in parallel relation thereto, said front chamber section being in communication with the main passage at a point in the proximity of the center line of the fuel injection nozzle, the entire length of said precombustion chamber being not greater than twice the diameter of said rear chamber section and the diameter of said rear chamber section being from about 1.4 to 2.0 times the diameter of said front chamber section at the open end thereof.

BRIEF DESCRIPTION OF THE DRAWINGS

The precombustion chamber of the present invention will be more fully described hereinafter with reference to the accompanying drawings, in which:

FIGURE 1 is a vertical cross section of an embodiment of the present invention;

FIGURE 2 is an exploded view, in cross section, of the critical portion of the precombustion chamber shown in FIGURE 1;

Description of the preferred embodiment

Figure 3:
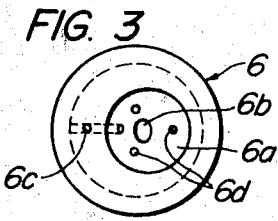
FIGURE 3 is a plan view of the member defining the front chamber section of the precombustion chamber.

Referring first to FIGS. 1 to 3, in which a preferred embodiment of the present invention is shown, reference numeral 1 designates a head cover having a key groove 1*a*, 2 a cylinder liner, 3 a fuel injection nozzle and 4 a piston. The precombustion chamber is composed of an upper member 5, a lower member 6 and an intermediate member 7. The upper member 5 consists of a body of revolution having formed therein a semispherical cavity 5*a* constituting a rear chamber section of the precombustion chamber and having an annular groove 5*b* formed in that end which is to be in contact with the fuel injection nozzle 3, in concentrical relation to a fuel injection port 5*c* of said fuel injection nozzle. The lower member 6 has formed therein a cavity 6*a* consisting of a space of revolution (a space which can be occupied by a body of revolution) constituting a front chamber section of the precombustion chamber and having a main passage 6*b*, a communication channel 6*c* and an auxiliary passage 6d, formed in the wall thereof. This lower member 6 is secured to the head cover 1 by a key 14 which is fitted in the key groove 1a. The intermediate member also consists of a body of revolution having formed therein a cylindrical hollow 7a constituting a lower portion of the rear chamber section. The thin walled portion 8 at the end of the upper member 5 is flexible to act as a leaf spring. The fuel injection nozzle 3 is disposed in a nozzle holder 9. Since the contacting surface of the fuel nozzle 3 with the upper member 5 is projecting forwardly of the contacting surface of the nozzle holder 9 as shown in FIG. 2, when the nozzle holder 9 is mounted on the upper member 5, the thin walled portion 8 of said upper member 5 is caused to bend inwardly by the fuel nozzle, as shown in FIG. 1, due to the spring action of said thin walled portion, producing a pressure contact therebetween and this pressure contact produces air tight sealing between the contact surfaces of the fuel nozzle 3 and the upper member 5. The nozzle holder 9 defines an annular groove 9a between it and the fuel valve 3 as shown. The front chamber section 6a and the rear chamber section 7a form a flat annular shoulder as indicated at 10. Reference numeral 11 designates the main body of the fuel nozzle 3, 12 a pressing plate for the fuel nozzle body, and 13 bolts for tightening the pressing plate 12. The center line X of the rear chamber section is substantially in alignment with the center line of the fuel nozzle 3. The center line Y of the front chamber section is offset from the center line X of the rear chamber section in parallel relation thereto. Thus, it will be seen that the rear chamber section 5a–7a and the front chamber section 6a are arranged in eccentrical relation. Reference character Z designates the center line of the engine cylinder. The entire length L of the precombustion chamber formed as described above is preferably not greater than twice the diameter D of the rear chamber section 5a–7a. The inlet of the main nozzle in the lower member is located at a point in the proximity of the center line of the fuel nozzle 3. The diameter of the rear chamber section 5a–7a is preferably from about 1.4 to 2.0 times the diameter r of the front chamber section at the open end thereof.

Because of the precombustion chamber of the present invention being constructed as described above, the air forced into the precombustion chamber through the main passage 6b is caused to swirl in the rear chamber section 5a upon colliding against the end wall of the upper member to form an eddy flow, which then collides against the shoulder 10 at the boundary between the rear and front chamber sections to produce a turbulent flow. Therefore, the air is thorougly mixed with a fuel injected in the rear chamber section through the fuel nozzle 3 toward the proximity of the shoulder 10, forming an excellent combustible mixture, which can be burnt quickly.

A conventional precombustion chamber is defective in that fuel particles tend to be accumulated at the peripheral corner of the rear chamber section 7a during starting of the engine, changing the configuration of said rear chamber section into substantially spherical shape, and consequently an excessively intense eddy flow occurs in said chamber section. Such intense eddy flow deteriorates the starting characteristic of the engine. According to the present invention, however, the rear chamber section is always maintained in its configuration and therefore the starting characteristic of the associated engine will not be deteriorated, because the fuel accumulating at the peripheral corner of the rear chamber section 7a is led into the front chamber section 6a through the communication channel 6c and further into the main combustion chamber of the engine cylinder from said front chamber section.

According to another feature of the present invention, the intermediate member 7 and the upper member 5, defining the rear chamber section of the precombustion chamber, the fuel nozzle 3 and the nozzle holder 9, are composed of bodies of revolution respectively, so that it is only necessary to secure the lower member 6 to the head cover 1 by means of the key. This is advantageous in simplifying the structure of the precombustion chamber. In this case, it is to be understood that, although in the embodiment shown, the precombustion chamber is composed of three unit members, it may, of course, be composed of two unit members.

Figure 4:
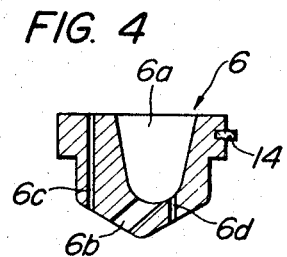
FIGURE 4 is a vertical cross section of another form of the member shown in FIGURE 3.

Another embodiment of the present invention is shown in FIG. 4, in which like numerals indicate the same parts as in the first embodiment. This embodiment is constructed and functions in the same manner as the first embodiment, except that the communication channel 6c has one end open in the rear chamber section at a point on the shoulder 10 but the other end thereof is open directly in the main combustion chamber of the engine cylinder.

Figure 5:
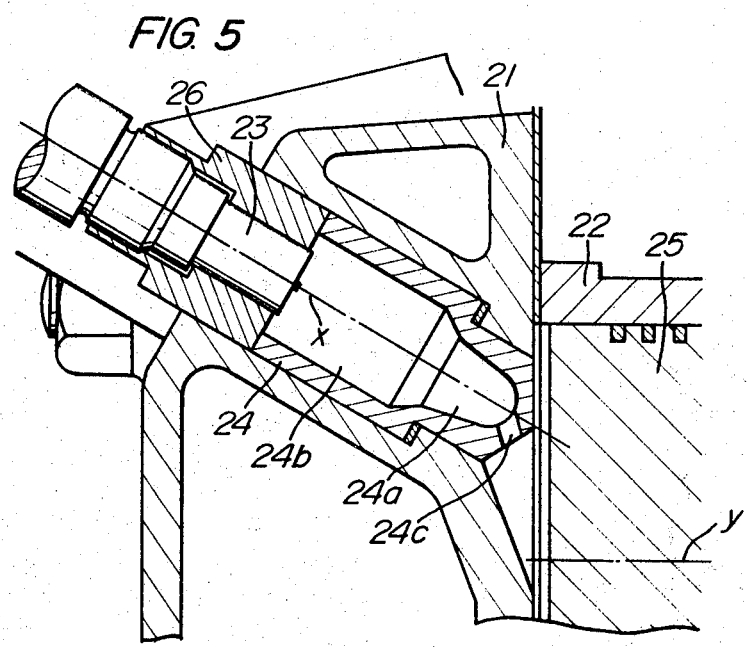
FIGURE 5 is a vertical cross section of a conventional precombustion chamber.

FIG. 5 shows a conventional precombustion chamber, in which reference numeral 21 designates a head cover, 22 a cylinder liner, 23 a fuel injection nozzle, 24 a precombustion chamber formed with a front chamber section 24a and a rear chamber section 24b and having a main passage 24c, 25 a piston and 26 a fuel nozzle holder, the characters x and y indicating the center lines of the precombustion chamber and the engine cylinder respectively.

Figure 6:
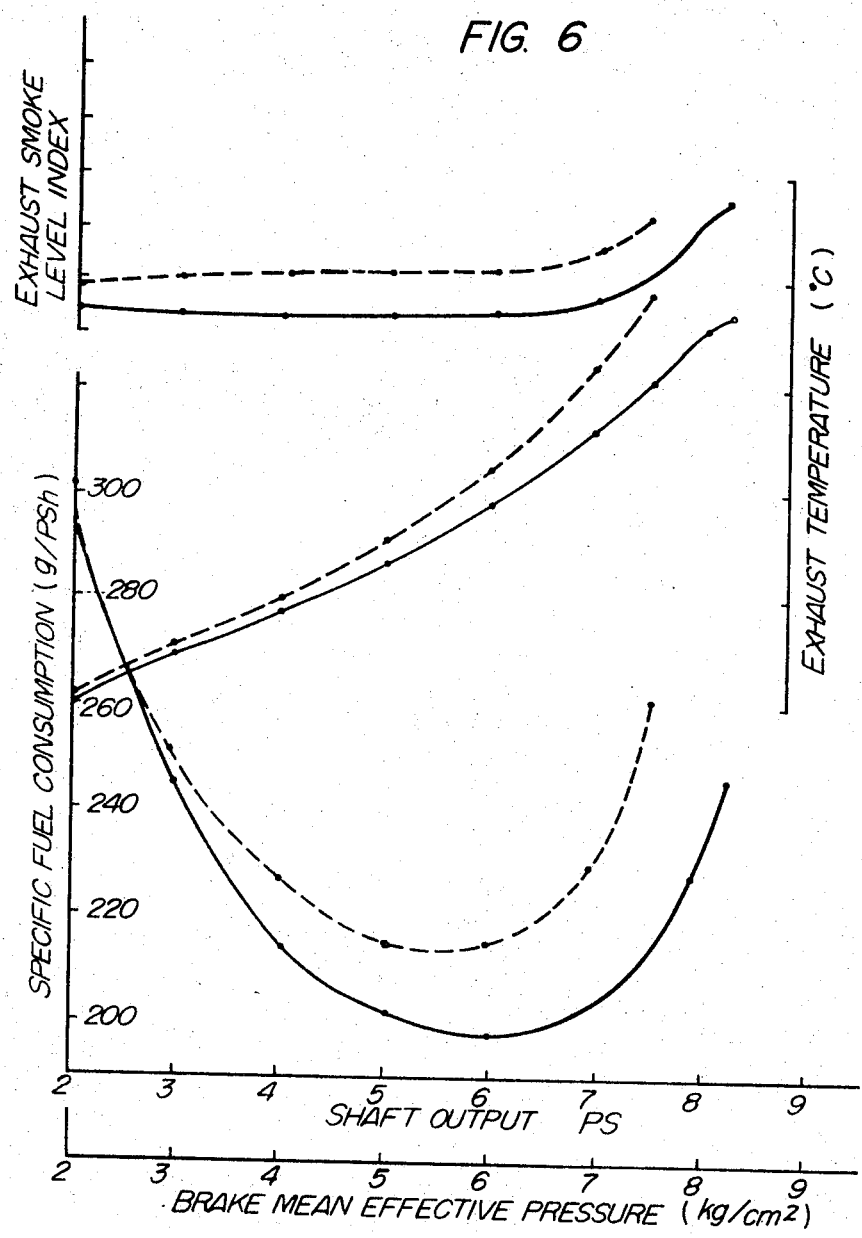
FIGURE 6 is a chart illustrating the performances of an engine provided with the precombustion chamber of this invention, in comparison with the performances of the same engine provided with the conventional precombustion chamber.

Referring now to FIG. 6, there is shown a chart which illustrates the performances of an engine provided with the precombustion chamber of the present invention shown in FIGS. 1 to 3, in comparison with the performances of the same engine provided with the conventional precombustion chamber shown in FIG. 5, said engine being 75 mm. in diameter and 85 mm. in stroke and operating at 2000 r.p.m. In the chart, the curve $X_1$ represents the specific fuel consumption (g./PSh.) of the engine with the present precombustion chamber and $X_2$ represents that of the engine with the conventional precombustion chamber; $Y_1$ represents the exhaust temperature (°C.) of the engine with the present precombustion chamber and $Y_2$ represents that of the engine with the conventional precombustion chamber; and $Z_1$ represents the exhaust smoke level index of the engine with the present precombustion engine and $Z_2$ represents that of the engine with the conventional precombustion chamber, the axis of ordinate of the chart being scaled by specific fuel consumption, exhaust temperature and exhaust smoke level index for the respective curves and the axis of abscissa being scaled by shaft output (PS) or brake mean effective pressure (kg./cm.$^2$). As will be apparent from the chart, the specific fuel consumption of the engine with the present precombustion chamber is about 10% less than that of the engine with the conventional precombustion chamber, and the exhaust temperature and the exhaust smoke level index of the former are also lower than those of the latter.

According to the present invention, since no fuel is permitted to accumulate on the shoulder, a suitable eddy flow is maintained in the rear chamber section during starting of the engine. Therefore, it is possible to obtain an excellent starting characteristic of the engine. Further, since the turbulence effect at the shouldered portion is promoted by the stream jetting into the rear chamber section through the communication channel during starting of the engine, the combustion efficiency of the fuel can be enhanced. Still further, since the area of contact between the upper member of the precombustion chamber assembly and the fuel nozzle or the nozzle holders is minimized due to the annular space formed therebetween, overheating of the fuel nozzle can be avoided and air tightness between the upper member of the precombustion chamber assembly and the fuel nozzle can be obtained in a simple manner. Still further, due to the very logical configuration, the precombustion chamber of this invention enables the performances of the associated engine to be improved remarkably.

We claim:
1. A precombustion chamber of a diesel engine, which is formed with a rear chamber section defined by a cylindrical member and having its top end portion shaped into semispherical or substantially semispherical configuration, and a front chamber section in communication with said rear chamber section, the center line of said rear chamber section being inclined at a suitable angle with respect to the center line of the engine cylinder and being substantially in alignment with the center line of a fuel injection nozzle, the center line of said front chamber section being offset from the center line of said rear chamber section in parallel relation thereto, said front chamber section being in communication with a main passage at a point in the proximity of the center line of the fuel nozzle, said rear and front chamber sections being forming a flat annular shoulder at the boundary therebetween, and in the member defining said front chamber section there being formed a communication channel which has one end open in the rear chamber section at a point on said shoulder and the other end open in the front chamber.

2. A precombustion chamber of a diesel engine, which is formed with a rear chamber section defined by a cylindrical member and having its top end portion shaped into semispherical or substantially semispherical configuration, and a front chamber section in communication with said rear chamber section, the center line of said rear chamber section being inclined at a suitable angle with respect to the center line of the engine cylinder and being substantially in alignment with the center line of a fuel injection nozzle, the center line of said front chamber section being offset from the center line of said rear chamber section in parallel relation thereto, said front chamber section being in communication with a main passage at a point in the proximity of the center line of the fuel nozzle, said rear and front chamber sections being forming a flat annular shoulder at the boundary therebetween, and in the member defining said front chamber section there being formed a communication channel which has one end open in the rear chamber section at a point on said shoulder and the other end open in the main combustion chamber of the engine cylinder.

References Cited
UNITED STATES PATENTS

| | | | |
|---|---|---|---|
| 2,292,409 | 8/1942 | Steward | 123—32 |
| 2,857,891 | 10/1958 | Hoffman et al. | 123—32 |

LAURENCE M. GOODRIDGE, *Primary Examiner.*